March 18, 1969  H. G. TOBIN, JR., ET AL  3,433,058
ACOUSTIC FLATNESS MEASUREMENT DEVICE
Filed May 4, 1966
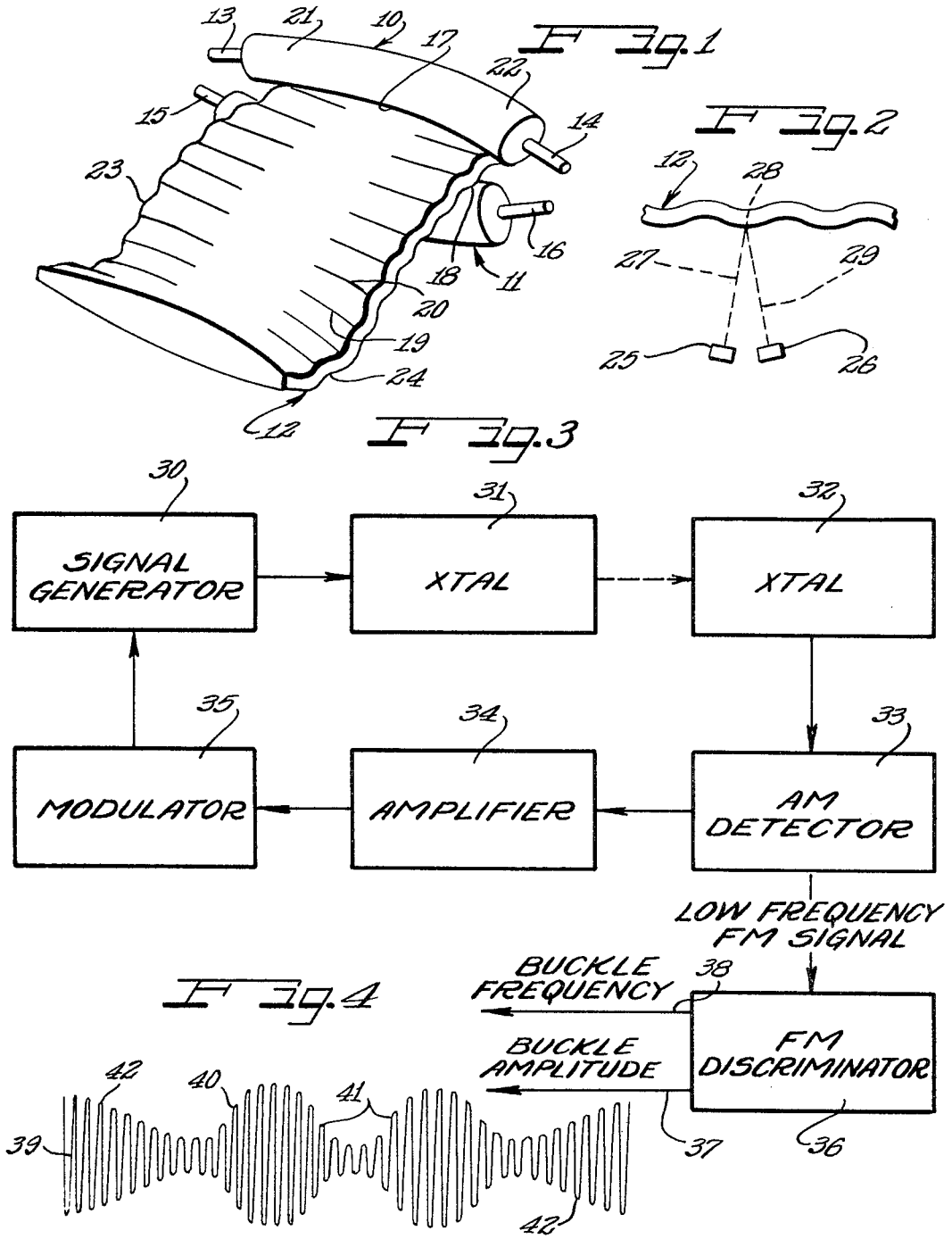
INVENTORS
Henry G. Tobin, Jr.
James N. Van Scoyoc
BY Hill, Sherman, Meroni, Gross & Simpson  ATTORNEYS

United States Patent Office 3,433,058
Patented Mar. 18, 1969

3,433,058
ACOUSTIC FLATNESS MEASUREMENT DEVICE
Henry G. Tobin, Jr., Chicago, and James N. Van Scoyoc, Oak Park, Ill., assignors, by mesne assignments, to United Engineering & Foundry Company, Pittsburgh, Pa., a corporation of Pennsylvania
Filed May 4, 1966, Ser. No. 547,492
U.S. Cl. 73—67.7                                    10 Claims
Int. Cl. G01n 9/24

ABSTRACT OF THE DISCLOSURE

An acoustic flatness measuring device used in the manufacture of steel sheet, having a closed energy loop circuit wherein a modulated frequency signal passing through a discriminator is indicative of the buckles and amplitude of the buckles appearing in the moving sheet.

---

This invention relates to an acoustical displacement detection system and more particularly relates to a novel displacement system utilizing acoustical techniques for detecting the non-flat quality of moving sheet material.

Sheet material such as sheet steel, aluminum or the like are generally produced by progressively rolling a large mass of material between compression rollers for generating a sheet type configuration. The rollers involved, however, must sustain appreciable compression forces if the larger mass of material is to be reduced into a comparatively thinner sheet.

If the compression forces applied to the individual rolls are such that the force on the material is non-uniform across the contacting face of the rolls, the sheet will tend to buckle in the regions where the compression force is the greatest. Various factors affect the compression at the surface of a mass of material being rolled into sheets, and it has been found that it is necessary to continuously adjust the pressure applied to the rolls in order to maintain sheet flatness. For instance, the type of material used, flaws or variations in the material structure, size and configuration of the material being rolled, temperature of the rolled material, and other variables are all factors which influence the effect derived from a given pressure applied to a given set of rolls. If, however, the flatness of a sheet could be continuously monitored as the sheet leaves a set of rolls, then the monitored information could be used as a means for adjusting the pressure applied to the rolls to develop a substantially flat sheet.

The problem of detecting ripples or buckles in an otherwise smooth sheet may be viewed as the problem of detecting displacement of the sheet. For instance, buckles in a horizontally disposed sheet may be considered to be vertical displacements of the general plane of the sheet. Furthermore, if the horizontal sheet is moving, as in the case of a sheet passing between compression rolls, a stationary observer would see the ripples or buckles as being a continuously rising and falling displacement of the sheet. Accordingly, displacement detection techniques can be employed to determine the flatness quality of moving sheets.

Various mechanical and electrical techniques can be employed to determine the surface nature of a moving sheet, however, techniques heretofore used have had the basic disadvantage of requiring actual physical contact with the sheet or of being to an unsatisfactory extent dependent upon the magnetic or electrical properties of the sheet. For instance, mechanical detection devices may require a sensing arm which actually rides along the surface of the moving sheet, and magnetic systems may use the fluctuation in the sheet amplitude to effect a spatial change between an armature and a sensing coil. The mechanical system tends to be cumbersome and generally insensitive, and the magnetic system, in addition to requiring physical contact with the sheet is dependent for accuracy upon the temperature, thickness, and other magnetic qualities of the sheet.

Accordingly, it is a principal object of his invention to provide a displacement detection device for detecting the displacement of a material which is at all times maintained in spaced relation with the device.

It is also an object of this invention to provide a displacement detection device which is maintained in spaced relation with the material being sensed and which operates independently of the magnetic or electrical properties of that material.

It is another object of this invention to provide a displacement detection system for detecting ripples, buckles, or undulations in a sheet moving between compression rolls for adjusting the rolling force applied at the surface of the rolls.

It is a further object of this invention to provide an acoustical detection system for sensing the non-flat quality of a moving material sheet which is capable of operating in a region of high environmental acoustical energy.

It is also an object of this invention to provide an acoustical detection system for sensing variations in the flatness quality of a moving sheet which is energized by a high frequency signal source and which is amplitude modulated for providing displacement information of the moving sheet material.

It is a further object of this invention to provide an acoustical flatness detection system for detecting irregularities at the surface of a moving material sheet wherein the acoustical generators are energized by a high frequency signal source and wherein a low frequency closed energy loop is provided for sensing the displacement information of the moving sheet.

It is an additional object of this invention to provide an acoustical detection system for detecting irregularities in the surface of a relatively moving sheet material wherein an acoustical transmitting element is energized by a high frequency signal source and wherein an amplitude modulation detector is provided to maintain a closed energy loop for frequencies substantially lower than the frequency of the signal source.

It is also an object of this invention to provide an acoustical detection system for detecting the flatness of a moving sheet having a transmitting and a receiving crystal and having a high frequency signal for energizing the transmitting crystal wherein an amplitude modulation detector is provided for separating the high frequency from the output of the receiving crystal and for applying a natural closed loop low frequency signal to a modulator for modulating the high frequency energy source and wherein an FM discriminator is provided for sensing the frequency and rate of frequency change of the closed loop energy signal.

These and other objects, features and advantages of the present invention will be understood in greater detail from the following description and the associated drawings wherein reference numerals are utilized in designating an illustrative embodiment and wherein:

FIGURE 1 is a diagrammatic illustration of a set of compression rolls showing a sheet being produced between the rolls under conditions of irregular pressure applied across the contacting face of the rolls;

FIGURE 2 is a diagrammatic view of the edge of a moving sheet similar to the sheet shown in FIGURE 1 showing the orientation of a transmitting and a receiving acoustical transducer according to this invention;

FIGURE 3 is a block diagram of an electrical system for describing the functioning of the acoustical flatness detection technique of this invention, and FIGURE 4 is a diagrammatic illustration of an amplitude modulated frequency modulated high frequency signal as detected at the output of the acoustical system illustrated in FIGURES 2 and 3.

Referring to the figures in greater detail, a set of compression rolls 10 and 11 are shown in FIGURE 1 operatively disposed for compressing an ingot or similar mass of sheet material into a rapidly moving sheet 12. The rolls 10 and 11 have end bearings 13, 14, 15 and 16 to which a hydraulic force or the like is applied for exerting a compression force on the moving sheet 12. The rolls 10 and 11 contact the sheet 12 at cooperable surfaces 17 and 18 and compress the material for reducing the thickness of the sheet.

If, however, the force applied to the end bearings 13 through 16 is such that the resulting compression force at the surfaces 17 and 18 of the rolls 10 and 11 is irregular, the sheet 12 will buckle as at points 19 and 20. For instance, if the pressure applied to the rolls 10 and 11 is excessive at the ends of the rolls as at areas 21 and 22, the sheet will be reduced more in those regions than at the center of the rolls. The reduced thickness of the sheets at the ends thereof as in the regions 23 and 24 creates longitudinal strips along the length of the sheet which are greater in length than the connected strip at the center thereof. Accordingly, the buckles 19 and 20 form at the longitudinal strips to accommodate the excess rolled material. Therefore, means must be provided to sense the buckles or ripples in the moving sheet and to apply corrective pressures to the bearings 13 through 16 for developing a uniform pressure across the faces 17 and 18 of the rolls 10 and 11. It is important to note, however, that even if the sheet is of uniform thickness, the sheet may buckle due to the development of excessive length in response to irregularities of the initial ingot.

The system utilized in this invention for sensing the fluctuations or variations in the surface character of the moving sheet 12 consist of first and second crystals 25 and 26 orientated relative to the moving sheet 12 such that an acoustical wave 27 emitted from the crystal 25 will be reflected from the sheet 12 at a point 28 through a reflected beam 29 to the crystal 26. In this way, the acoustical system is linked to the mechanical movement of the sheet 12.

It is well known that transducers such as piezoelectric elements when pulsed with an electrical signal will generate an acoustical wave in response thereto. It is also understood that such an acoustical wave generated by a first piezoelectric crystal may be received by a second crystal which will then develop an electrical signal substantially similar to the original signal impulse. Theoretically, if losses could be neglected, the electrical impulse developed at the receiving crystal by the impending acoustical wave could be connected directly to the transmitting crystal which would in turn develop a second acoustical wave for further stimulating the receiving crystal. Such a system would be regenerative and would have a frequency response which is dependent upon the length of the acoustical path between the transmitting and receiving crystal.

If the output signal at the receiving crystal is connected to an amplifier, and the amplified signal is applied to the transmitting crystal, energy losses can be discounted and the system will function at its natural frequency. The frequency of oscillations will be established such that a total phase shift of $2\pi$ is experienced around the energy loop. For instance, if a 180° phase shift is experienced in the amplifier, a 180° further phase shift will be found in the acoustical signal.

Once, however, an acoustical signal is established between the transmitting and receiving crystal which satisfies the 180° phase shift requirement, that frequency will remain substantially stable until the acoustical path length is altered between the two crystals. Should the acoustical path lengths be so altered, a new frequency would be required to be established in order to assure that 180° phase shift existed between the crystals. For example, should the path length be slightly lengthened, the frequency of oscillations would be required to slightly decrease in order to provide a longer wave length which will develop a 180° phase shift for the new acoustical path. In contrast, if the acoustical path should be shortened, a slightly higher frequency would be required to provide a shorter wave length and, hence, a shorter 180° phase shift. It is apparent, therefore, that in such a system, the frequency of the oscillations are indicative of the acoustical path length between the transmitting and receiving crystal and, hence, are indicative of the distance of the moving sheet relative to the stationary crystals.

Since the natural oscillating frequency and the detectable displacement of a moving sheet are related in such an acoustical detection system, it is apparent that if large sheet displacements are required to be sensed, the system must be established such that a relatively low frequency acoustical wave is generated. For instance, if a displacement of one foot is required to be detected, an oscillation frequency in the order of 250 cycles per second is required to be established. However, in generating a 250 cycle per second acoustical wave, the very detection qualities required are lost. First, at 250 cycles per second, sound from an acoustical transducer tends to fan out into the surrounding environment and cannot be concentrated into a direct beam for detecting ripples or buckles in the moving sheet. This means that the resolution of a 250 cycle wave is not capable of distinguishing between abrupt irregularities in the surface of the sheet. Also, a 250 cycle per second wave requires an unreasonably large acoustical transducer and an unreasonably large energy source in order to generate a wave which may be detected at a receiving transducer. In addition, environmental noises in the range of 250 cycles per second are common in plants where sheet material of the type described herein are produced.

To overcome the disadvantages associated with the requirements for a long wave length signal in an acoustical closed loop system, a signal generator 30 is provided in the acoustical system of FIGURE 3 for applying the high frequency signal to a transmitting crystal 31. The signal developed by the signal generator 30 may be in the order of 100 kilocycles per second and hence the acoustical wave developed by the crystal 31 will similarly be in the order of 100 kilocycles per second. This means that the crystal 31 may be relatively minute in size and that the signal generated by the crystal 31 will have a high degree of resolution for discriminating between abrupt changes in the surface configurations of the moving material sheet. Also, 100 kilocycles per second, as developed by the signal generator 30, will be substantially above the frequency of the environment of the acoustical energy present in a production area such as in a steel mill or the like. However, the high frequency associated with the signal generator 30 will have a short wave length and, accordingly, will of itself be unable to detect sizable changes in the displacement of a sheet as might be expected in the displacement of a fast moving relatively thin steel sheet or the like. Accordingly, means must be provided to assure that the system can accommodate the detection of large as well as small displacements.

The 100 kc. acoustical signal generated by the crystal 31 is reflected by the moving sheet and received at the receiving crystal 32. The acoustical energy impacting at the crystal 32 develops an electrical signal corresponding in frequency to the frequency of the acoustical wave, namely approximately 100 kilocycles per second.

The electrical signal developed by the acoustical wave at the crystal 32 is connected to an amplitude modulation detector 33, the output of which is fed to an amplifier 34. The amplifier 34 provides the energy input to the system and increases the gain of the detected wave. The amplifier 34 is then connected to a modulator 35 which, in turn, is connected to the signal generator 30. It can be seen then that a closed loop path is provided between the signal generator, the two crystals, the AM detector, the amplifier, and the modulator. Accordingly, a natural frequency will develop within the closed system such that a $2\pi$ phase shift is accomplished around the system loop. However, due to the relative physical placement of the crystals and the moving sheet, the natural frequency developed by the system will be substantially lower than the carrier frequency produced by the signal generator 30.

The effect of the closed loop system and the relative magnitudes of the natural frequency developed through the acoustical and electrical path and the high frequency produced by the signal generator 30 is that the high frequency signal becomes a carrier signal and the natural closed loop oscillations becomes a modulating waveform. It can be seen, then, that by using the amplitude detector to separate the high signal frequencies from the output of the crystal 32, the remaining natural low frequency signal is allowed to be regenerative for sustaining the low frequency oscillations. In particular, only the low frequency oscillations are amplified through the amplifier 34 and are used in the modulator 35 to modulate the high frequency carrier signal developed by the generator 30. Accordingly, all measurement advantages associated with having a low frequency signal are preserved, while the low frequency signal in the acoustical path between the transmitting crystal 31 and the receiving crystal 32 responds substantially as a high frequency signal and accordingly has high resolution and a high crystal-to-air coupling efficiency.

The low frequency modulation signal which is developed in the closed loop energy circuit as shown in FIGURE 3 has a frequency which is determined by the acoustical path distance between the crystal 31 and the crystal 32. Should the acoustical path length be altered, the frequency of the modulation signal would accordingly be altered in order to provide the appropriate phase shift between the crystals which will add to produce a $2\pi$ or 360° phase shift about the circuit loop. Therefore it is the modulation signal rather than the energizing high frequency signal which is frequency adjusted according to the variable path length between the cooperable crystals. Hence, the output signal of the receiving crystal 32 will be an amplitude modulated frequency modulated wave. The high frequency carrier signal is then removed at the AM detector 33 and the output of the AM detector is a frequency modulated signal which contains the displacement information associated with the moving sheet.

Two types of information are available from the low frequency, frequency modulated signal available at the output of the amplitude modulation detector 33. In particular, the frequency of the output signal will be indicative of the degree of displacement or the amplitude of the buckle at the surface of the moving sheet. Therefore, a direct frequency reading will provide the information as to the nature of the buckles occurring at the sheet surface. Also, the rate at which the frequency varies within the low frequency, frequency modulated signal is an indication of the rate at which the buckles are occurring at the surface of the sheet. That is, if the frequency of the output signal fluctuates between 200 and 250 cycles per second at a rate of 50 cycles per second, for example, it is known that the buckles occurring at the surface of the sheet are repeating at a rate of 50 buckles per second. Therefore, given the longitudinal speed of the moving sheet, the exact nature of the surface irregularities can be determined.

To detect the information available at the frequency modulated output signal of the AM detector 33, an FM discriminator 36 is connected directly to the AM detector 33 and is provided with first and second outputs 37 and 38. The output 37 may be a voltage signal having a level which is proportional to the frequency of the signal detected by the FM discriminator which in turn is proportional to the deviation or amplitude of the buckles at the surface of the moving sheet. The output 38 may be a voltage level which is sensitive to a counting device wherein the rate of change of frequency about a given frequency level may be counted and related to the frequency that the buckles may occur at the surface of the moving sheet.

For illustrative purposes, the output signal of the crystal 32 is shown in FIGURE 4 and includes a carrier signal 39 which is the signal generated by the signal generator 30 and may be in the order of 100 kilocycles per second. The carrier signal 39 is amplitude modulated according to the natural frequency adjustment of the closed loop acoustical system. The result is an envelope 40 which may be in the order of 250 cycles per second. However, the demodulated signal 40 is in turn frequency modulated according to the displacement of the moving sheet. For instance, as the sheet moves closer to the crystals 31 and 32, the frequency may be increased, as at the points 41, while the frequency is decreased as at the points 42 as the sheet moves away from the crystals 31 and 32. Therefore, the instantaneous frequency of the envelope is proportional to the amplitude of the buckles, while the rate of frequency change is proportional to the rate at which the buckles appear.

It will be understood that various modifications and combinations of the features described herein may be accomplished by those versed in the art, but we desire to claim all such modifications and combinations as properly come within the scope and spirit of our invention.

We claim as our invention:

1. An acoustic displacement measurement system comprising:
   a first electromechanical transducer for converting an electrical signal into an acoustical wave,
   a second electromechanical transducer spaced from said first transducer for receiving an acoustical wave generated by said first transducer and for developing an electrical signal in response thereto,
   said first transducer being orientated for directing an acoustical wave in the direction of a substance subject to displacement, said second transducer being orientated for receiving an acoustical wave generated by said first transducer as reflected from the surface of the substance subject to displacement,
   carrier means for electrically energizing said first transducer with a high frequency signal,
      said electrical signal developed by said second transducer having a relatively high frequency component modulated by a low frequency signal,
   detection means for recovering the low frequency modulation signal from the output of said second transducer, and
   modulator means for modulating said carrier means in accordance with the low frequency output of said detection means.

2. An acoustic displacement measurement system in accordance with claim 1 wherein:
   a closed energy loop is provided by said first and second transducers, detection means, modulator means and carrier means,
   said closed energy loop developing a $2\pi$ phase shift in the circuit transmission of the electrical mechanical energy signal.

3. An acoustic displacement measurement system in accordance with claim 2 wherein:
   a high frequency carrier signal applied to said first electromechanical transducer is in the order of 100–500 kilocycles per second and wherein said high frequency carrier is amplitude modulated in accordance with the natural phase response of said closed energy loop and wherein demodulator means are provided for demodulating the output of said detection means to recover information indicative of variations in the acoustical path between said first and second transducers.

4. An acoustic displacement measurement system in accordance with claim 2 wherein:
   said detection means comprises an amplitude modulation detector and wherein a frequency discriminator is provided for sensing frequency variations in the output of said amplitude modulation detector.

5. An acoustical flatness measuring system comprising:
   a first acoustical transducer disposed for being adjacent to and spaced from the plane of a moving sheet of material being sensed,
   a signal generator connected to said first acoustical transducer for supplying a relatively high frequency signal thereto,
      said first transducer developing an acoustical wave having a frequency substantially identical to the frequency of said signal generator,
      said first transducer directing the acoustical wave for being reflected by the moving sheet of material being sensed to a second acoustical transducer,
   a second acoustical transducer for receiving the acoustical wave generated by said first acoustical transducer and for developing an electrical response thereto having a frequency equal to the frequency of said signal generator,
   an amplitude modulation detector for separating high from low frequencies in the output response of said second acoustical transducer,
   means for applying the low frequency output of said amplitude modulation detector to said signal generator for developing a closed low frequency energy loop thereby, and
   means for detecting the frequency response of the closed loop energy.

6. An acoustical flatness measuring system in accordance with claim 5 wherein means are provided for amplitude modulating the high frequency carrier output of said signal generator with the closed loop energy response and wherein said means for detecting the frequency response of the closed loop energy comprises a frequency modulation discriminator having an output signal level responsive to the input signal frequency.

7. An acoustical flatness measurement device comprising:
   an acoustical transmitting crystal for directing acoustical energy to a sheet being sensed and an acoustical receiving crystal responsive to energy transmitted by said transmitting crystal,
   a closed loop electrical mechanical energy system including an electrical and an acoustical energy transfer path between said crystals,
      said closed loop system being energized by a high frequency signal source which source is amplitude modulated in accordance with the natural phase response of said closed loop system, and
   means for registering the amplitude modulation frequency of the amplitude modulated high frequency signal.

8. An acoustical flatness measurement device in accordance with claim 7 wherein an amplitude modulation detector is provided within said closed loop energy system for extracting the high frequency signal from the closed loop system and for maintaining the presence of the low frequency amplitude modulation signal in the closed loop system.

9. In a manufacturing plant having a set of rolls for compressing a rapidly moving sheet therebetween, a flatness detection system including:
   a pair of acoustical crystals disposed adjacent to a surface of a sheet being compressed between the rolls,
   one of said crystals transmitting an acoustical signal to the moving sheet and the other crystal receiving a reflected signal from the sheet,
   a signal generator applying a high frequency signal to the transmitting crystal and a closed energy loop provided through the signal generator and the acoustical path between said crystals,
      said closed energy path providing a natural low frequency modulation signal for modulating the output of said signal generator,
      said low frequency modulation signal having a frequency dependent upon the length of the acoustical path between said crystals,
   whereby buckles in the moving sheet develop frequency variations in the modulation signal, and
   means for detecting the frequency of the modulation signal to determine the amplitude and rate of buckles in the moving sheet.

10. In a manufacturing plant in accordance with claim 9 wherein an amplitude modulation detector is provided for maintaining only low frequency closed loop response and wherein an FM discriminator is provided for sensing the frequency of the closed loop energy and wherein the system includes means for determining the rate of change of the closed loop frequency as well as the magnitude of the frequency change.

References Cited

"Progress in Ultrasonic Methods of Materials Testing," by O. Rudiger (from Stahl and Eisen, vol. 70, No. 13, June, 1950, pp. 561–565) October, 1950.

Engineers' Digest, vol. 11, No. 10, p. 354, "Resonance Methods."

RICHARD C. QUEISSER, *Primary Examiner.*

R. S. SALZMAN, *Assistant Examiner.*

U.S. Cl. X.R.

73—105; 307—211, 223